United States Patent [19]
Dawson et al.

[11] Patent Number: 5,432,152
[45] Date of Patent: Jul. 11, 1995

[54] INVERT DRILLING FLUID

[75] Inventors: Raymond B. Dawson; Joel F. Carpenter, both of Baton Rouge, La.

[73] Assignee: Albemarle Corporation, Richmond, Va.

[21] Appl. No.: 291,250

[22] Filed: Aug. 16, 1994

Related U.S. Application Data

[63] Continuation of Ser. No. 69,468, Jun. 1, 1993, abandoned.

[51] Int. Cl.⁶ ............................................. C09K 7/02
[52] U.S. Cl. ............................................... 507/103
[58] Field of Search ........................................ 507/103

[56] References Cited

U.S. PATENT DOCUMENTS

| | | | |
|---|---|---|---|
| 2,797,196 | 6/1957 | Dunn et al. | 252/8.5 |
| 2,816,073 | 12/1957 | Stratton | 252/8.5 |
| 2,943,051 | 6/1960 | Lummus | 252/8.5 |
| 3,288,715 | 11/1966 | Owens et al. | 252/59 |
| 3,775,447 | 11/1973 | Andrews et al. | 260/404.5 |
| 3,878,111 | 4/1975 | McGlothlin et al. | 252/8.5 M |
| 3,948,782 | 4/1976 | Dreher et al. | 252/8.5 P |
| 3,970,570 | 7/1976 | Pratt et al. | 252/49.9 |
| 4,498,994 | 2/1985 | Heilweil | 252/8.5 M |
| 4,508,628 | 4/1985 | Walker et al. | 252/8.5 P |
| 4,787,990 | 11/1988 | Boyd | 252/8.511 |
| 4,996,366 | 2/1991 | Tinucci et al. | 568/454 |
| 5,045,219 | 9/1991 | Trahan et al. | 252/8.51 |
| 5,077,067 | 12/1991 | Koyama et al. | 585/3 |
| 5,096,883 | 3/1992 | Mercer et al. | 507/103 |
| 5,171,903 | 12/1992 | Koyama et al. | 585/3 |
| 5,189,012 | 2/1993 | Patel et al. | 507/103 |
| 5,250,750 | 10/1993 | Shubkin et al. | 174/17 LF |

FOREIGN PATENT DOCUMENTS

| | | | |
|---|---|---|---|
| 649477 | 10/1962 | Canada | 252/100 |
| 0449257 | 10/1991 | European Pat. Off. | C09K 7/06 |
| 2166782 | 5/1986 | United Kingdom | C09K 7/06 |
| 2212192 | 7/1989 | United Kingdom | C09K 7/06 |
| 1055750 | 11/1983 | U.S.S.R. | C09K 7/06 |
| 8302949 | 9/1983 | WIPO | C09K 7/06 |

OTHER PUBLICATIONS

U.S. Statutory Invention Registration No. H1000, Dec. 3, 1991, Patel et al.

*Primary Examiner*—Philip Tucker
*Attorney, Agent, or Firm*—David M. Bunnell

[57] ABSTRACT

An environmentally friendly invert drilling fluid comprises a water-in-oil emulsion which includes (a) at least 50 volume percent of a low toxicity base oil, and (b) at least one additive selected from the group consisting of emulsifiers, viscosifiers, weighting agents, oil wetting agents and fluid loss preventing agents, at least about 25 volume percent of the base oil content of the drilling fluid being one or more linear alpha-olefins which have from about 14 to 30 carbon atoms.

15 Claims, No Drawings

INVERT DRILLING FLUID

This application is a continuation of application Ser. No. 08/069,468, filed Jun. 1, 1993, now abandoned.

The invention relates generally to invert drilling fluids and more specifically to environmentally friendly drilling fluids whose oil phase includes linear alpha-olefins having from about 14 to 30 carbon atoms.

Historically, first crude oils, then diesel oils and, most recently, mineral oils have been used in formulating invert drilling fluids (oil based muds). Due to problems of toxicity and persistence which are associated with these oils, and which are of special concern in off-shore use, the industry is developing drilling fluids which use "pseudo-oils" for the oil phase. Examples of such oils are fatty acid esters and branched chain synthetic hydrocarbons such as polyalphaolefins. Fatty acid ester based oils have excellent environmental properties, but drilling fluids made with these esters tend to have lower densities and are prone to hydrolytic instability. Polyalphaolefin based drilling fluids can be formulated to high densities, have good hydrolytic stability and low toxicity. They are, however, somewhat less biodegradable than esters, they are expensive and the fully weighted, high density fluids tend to be overly viscous. U.S. Pat. No. 5,096,883 discloses the use of such branched chain synthetic, hydrogenated oils which have the advantage, over most natural petroleum base oils, of being considered "non-toxic" in that they pass the standard "Ninety-Six Hour Static Bioassay" test for mortality of mysid shrimp. The toxicity of natural oils is indicated to be due to the presence of aromatics and n-olefins in such oils.

We have now found that less expensive drilling fluids having excellent technical and environmental properties can be formulated by using linear alpha-olefins (n-olefins) as a part of or all of the base oil phase. Contrary to the suggestion in U.S. Pat. No. 5,096,883, the linear $\alpha$-olefins having carbon numbers of $C_{14}$ and above were found to have a sufficiently low toxicity so as to pass the mysid shrimp toxicity testing standards.

In accordance with this invention there is provided an invert drilling fluid which comprises a water-in-oil emulsion which includes (a) at least 50 volume percent of a low toxicity base oil, and (b) at least one additive selected from the group consisting of emulsifiers, viscosifiers, weighting agents, oil wetting agents and fluid loss preventing agents, at least about 25 volume percent of the base oil content of the drilling fluid being one or more linear alpha-olefins having from about 14 to 30 carbon atoms.

Also provided is a method of lubricating a drill pipe when drilling a well, which method comprises circulating an invert drilling fluid throughout a borehole while simultaneously rotating a string of drill pipe having a drill bit on its lower end in contact with the bottom of the base hole so as to reduce the friction between the pipe and the sides of the borehole and to remove cuttings from the borehole, wherein said invert drilling fluid comprises a water-in-oil emulsion which includes (a) at least 50 volume percent of a low toxicity base oil, and
(b) at least one additive selected from the group consisting of emulsifiers, viscosifiers, weighting agents, oil wetting agents and fluid loss preventing agents, at least about 25 weight percent of the base oil content of the drilling fluid being one or more linear alpha-olefins having from about 14 to 30 carbon atoms.

Invert drilling fluids contain at least 50 volume %, and typically about 65 to 95 volume %, of a base oil as the continuous phase, no more than about 50 volume % of water, and various drilling fluid additives such as emulsifiers, viscosifiers, alkalinity control agents, filtration control agents, oil wetting agents and fluid loss preventing agents. The base oils usually have kinematic viscosities of from about 0.4 to 6.0 cSt at 100° C. According to this invention, at least about 25 volume percent and, preferably, 75 volume percent or more of the base oil comprises one or more linear alpha-olefins having from about 14 to 30 carbon atoms and, preferably, from about 14 to 20 carbon atoms. The preferred linear alpha-olefins and mixtures thereof, such as $C_4$, $C_{14-16}$, $C_{14-24}$, and $C_{16-18}$, are commercially available from Ethyl Corporation. Such alpha-olefin products are derived from Ziegler chain growth and may contain up to about 40 wt. percent, based on the total olefin content, of vinylidene and/or linear internal olefins.

Using the linear alpha-olefins has the advantage of lowering the viscosity of the mud to provide improved pump-ability in use when compared to, for example, muds which use polyalphaolefin oils (PAO's) such as hydrogenated 1-decene dimer, whose kinematic viscosity of 1.8 cSt at 100° C. is higher than optimum. In contrast, the 100° C. viscosities $C_{14}$ to $C_{20}$ linear alpha-olefins range from about 0.85 to 2.85 cSt. The linear alpha-olefins also have better biodegradability compared to the PAO's which have a branched chain structure. The linear alpha-olefins can be used either alone or in combination with other low-toxicity base oils such as, for example, low-toxicity mineral oils, esters and PAO's to improve the performance of the drilling fluid and/or lower costs.

The physical and environmental properties of some linear alpha-olefin (LAO) oils, and mixtures of the linear alpha-olefin oils with other low toxicity base oils, compared to two low toxicity mineral base oils and a PAO base oil, are reported in Table I wherein the percentages of each oil in the base oil are in volume percent.

TABLE I

| Property | $C_{14}$ LAO[1] | 25% $C_{16-18}$ LAO[2]– 75% PAO[3] | 50% $C_{16-18}$ LAO[2]– 50% PAO[3] | 75% $C_{16-18}$ LAO[2]– 25% PAO[3] | PAO[3,4] | Clairsol 350 M[5] Oil | DF-1[6] Oil |
|---|---|---|---|---|---|---|---|
| Visc. @40°C. (cSt) | 1.87 | 4.48 | 3.90 | 3.44 | 5.5 | 1.80 | 1.71 |
| Vis. @100°C. (cSt) | 0.87 | 1.60 | 1.48 | 1.39 | 1.8 | 0.84 | 0.81 |
| Pour Point (°C.) | −18 | −18 | −18 | −9 | ≦65 | −39 | −42 |
| Flash Point (°C.) closed cup | 107 | 146 | 145 | 148 | 155 | 76 | 75 |
| Biodegradability (%) by CEC L33 T82 | 99 | not tested | not tested | not tested | 91 | 90 | 64 |
| Toxicity:# | NR[7] | NR | NR | NR | NR | 32,803 | >49,500 |

TABLE I-continued

| | | OIL | | | | | |
|---|---|---|---|---|---|---|---|
| Property | $C_{14}$ LAO[1] | 25% $C_{16-18}$ LAO[2]– 75% PAO[3] | 50% $C_{16-18}$ LAO[2]– 50% PAO[3] | 75% $C_{16-18}$ LAO[2]– 25% PAO[3] | Clairsol PAO[3,4] | 350 M[5] Oil | DF-1[6] Oil |
| Microtox $EC_{50}$ (SPP) | | | | | | | |

[1]Typically about 95% wt $C_{14}$ with 80 mol % minimum linear alpha-olefin
[2]Typically about 55/35/10% by wt $C_{16}/C_{18}/C_{20}$ with 60 mol % minimum linear alpha-olefin
[3]ETHYLFLO ® 162 polyalphaolefin from 1-decene
[4]Properties are product specification
[5]"Low-Toxicity" mineral oil
[6]"Low-Toxicity" mineral oil
[7]No toxic response detected It can be seen from the data reported in Table I that the linear alpha-olefin oils have excellent toxicity and aquatic biodegradability properties. Their physical properties are suitable for drilling fluids and the flash points at comparable viscosities are superior to low-toxicity mineral oils.

The CEC (Coordinating European Council) L33 T82 protocol was developed to determine the persistence of 2-stroke outboard engine oil in aquatic environments. In recent years, results from this test have been applied more broadly. The test is fast becoming a standard for aquatic biodegradability for water insoluble materials. Note that this test is not a test of "ready biodegradability" but "comparative biodegradability." These terms are tightly defined by regulatory bodies.

The CEC L33 T82 test procedure is summarized as follows: Test flasks, together with poisoned flasks, (each in triplicate) containing mineral medium, test oil and inoculum are incubated for 0 to 21 days. Flasks containing calibration materials in the place of the test oil are run in parallel. At the end of the incubation times, the contents of the flasks are subjected to sonic vibration, acidified, and extracted with $CCl_4$ or R113. The extracts are then analyzed by Quantitative IR Spectroscopy, measuring the maximum absorption of the $CH_3$-band at 2930 cm$^{-1}$. The biodegradability is expressed as the % difference in residual oil content between the test flasks and the respective poisoned flasks at day 21.

The Microtox $EC_{50}$ Standard Particulate Phase (SPP) test procedure is summarized as follows:

Bioluminescent bacteria are exposed to progressively increasing concentrations of the test article. The calculated concentration at which their light emissions are decreased by 50% is referred to as the $EC_{50}$ or the Effective Concentration 50. SPP is the preferred EPA method of preparing drilling fluids for toxicity assays. The drilling fluid is diluted 1:9 in artificial sea water, mixed for 5 minutes, pH adjusted, and then allowed to settle. The aqueous phase is treated as the undiluted test article.

Table II provides additional toxicity results for drilling muds, which contain 10% base oil in EPA's Generic Mud #7, according to the 96 hour $LC_{50}$ mysid shrimp acute toxicity test wherein the percentages of each oil in the base oil are in volume percent.

The NPDES (National Pollutant Discharge Elimination System) standard for discharge into the Gulf of Mexico is an $LC_{50} > 30{,}000$ ppm (SPP, mysid shrimp, 96-hour acute toxicity). Drilling muds which meet this standard are considered to be non-toxic.

TABLE II

| 96-Hour $LC_{50}$ in *Mysidopsis bahia*[3] (in ppm of the SPP) | |
|---|---|
| Oil | $LC_{50}$ |
| 75% E162 PAO | >480,000 |

TABLE II-continued

| 96-Hour $LC_{50}$ in *Mysidopsis bahia*[3] (in ppm of the SPP) | |
|---|---|
| Oil | $LC_{50}$ |
| 25% $C_{16}C_{18}$ LAO 50% E162 PAO | 289,000 |
| 50% $C_{16}C_{18}$ LAO 25% E162 PAO | 213,000 |
| 75% $C_{16}C_{18}$ LAO | |
| $C_{14}$ LAO | 44,700 |
| Clairsol 350 M Oil | 8,600 |
| $C_{12}C_{26}$ LAO[1] | 27,200 |
| $C_{12}C_{14}$ LAO[2] | 19,500 |

[1]Typically about 3/28/28/23/18 wt. % $C_{10}/C_{12}/C_{14}/D_{16}/C_{18}$ with 15 mol % linear α-olefin
[2]Typically about 62/37/1 wt. % $C_{12}/C_{14}/C_{16}$ with 87 mol % linear α-olefin
[3]The mud tested is 10% Base Oil/90% EPA Generic Mud #7

As shown in the data presented in Table II, the toxicities of comparison muds made with the mineral oil Clairsol 350 M oil, and linear alpha-olefin oils which contained material having less than 14 carbon atoms, e.g. $C_{12}C_{26}$, and $C_{12}C_{14}$ mixtures failed to meet >30,000 ppm SPP standard established by NPDES for ocean disposal.

Besides the oil phase, the drilling fluid of the invention has a water phase of up to 50 volume percent, (preferably about 5 to 35 volume percent) which contains up to about 35 to 38 wt. %, (preferably about 20 to 35 wt. %) of sodium or calcium chloride. The water in oil emulsion is formed by vigorously mixing the base oil and oil together with one or more emulsifying agents. Various suitable emulsifiers are known in the art and include, for example, fatty acid soaps, preferably calcium soaps, polyamides, sulfonates, triglycerides, and the like. The fatty acid soaps can be formed in situ by the addition of the desired fatty acid and a base, preferably lime. The emulsifiers are generally used in amounts of from about 1 to 8 kilograms per cubic meter of drilling fluid.

The drilling fluids also include, as known in the art, one or more additives such as viscosifiers, weighting agents, oil wetting agents and fluid loss preventing agents to enable the fluids to meet the needs of particular drilling operations. The additives function to keep cutting and debris in suspension, provide the required viscosity, density and additive wetting properties to the fluid, and prevent the loss of liquids from the fluid due to the migration of the liquids into the formations surrounding the well bore.

Clay and polymer viscosifiers such as, for example, bentonite and attapugite (which are sometimes reacted with quarternary ammonium salts), polyacrylates, cellulose derivatives, starches, and gums can be used in amounts of from about 0.5 to 5 kilograms per cubic meter of drilling fluid.

The density of the drilling fluid can be increased by using weighting agents such as barite, galena, iron oxides, siderite and the like, to give densities ranging from about 950 to 2400 kilograms per cubic meter of drilling fluid.

In order to assist in keeping solid additives in suspension in the drilling fluid, oil wetting agents, such as lecithin or organic esters of polyhydric alcohols, can be added in amounts of up to about 4 kilograms per cubic meter of drilling fluid.

Fluid loss agents, such as organophilic humates made by reacting humic acid with amides of polyalkylene polyamines, act to coat the walls of the bore hole and are used in amounts of up to about 7 kilograms per cubic meter of drilling fluid.

The invention is further illustrated by, but is not intended to be limited to, the following example.

EXAMPLE 1

Four oil base (invert mud) drilling fluids were formulated using various linear alpha-olefin (LAO) containing base oils according to the following formulation:

| Base Oil, mL | 262 |
| --- | --- |
| 30% aqueous $CaCl_2$, mL | 88 |
| VERSAMUL ®, g emulsifier[1,4] | 3 |
| VERSAWET ®, g wetting agent[2,4] | 4 |
| VG-69 ®, g viscosifier[3,4] | 5 |
| Lime, g | 10 |

[1]VERSAMUL ® is a blend of emulsifiers, wetting agents, gellants, and fluid stabilizing agents. It requires the addition of lime which affords a calcium soap. It is a primary additive in "conventional" invert mud systems.
[2]VERSAWET ® is a wetting agent, based on fatty acids.
[3]VG-69 ® is a viscosifier and gelling agent. It is a bentonite-based organophilic clay.
[4]Products of MI Drilling Fluids Co.

A finished invert mud would also contain enough barite to give the density needed for a particular bore hole. The characteristics of the formation through which the bore hole is drilled would also dictate whether the mud would require a fluid loss control agent.

The properties of the drilling fluids are reprinted in Table III below wherein the percentage of each oil in the base oil are in volume percent. Although the formulations were not optimized, the linear alpha-olefin containing oils formed stable emulsions, and each responded to the viscosifier.

than 30,000 ppm (SPP, mysid shrimp, 96-hour acute toxicity) (b) an emulsifier, and (c) at least one solid additive suspended in said drilling fluid, at least about 25 volume percent of the base oil content of the drilling fluid being one or more linear alpha-olefins which have from about 14 to 30 carbon atoms.

2. The fluid of claim 1 wherein said linear alpha-olefins have from about 16 to 20 carbon atoms.

3. The fluid of claim 1 wherein at least about 75 volume percent of the base oil content is one or more linear alpha-olefins.

4. The fluid of claim 1 in which the base oil comprises one or more linear alpha-olefins and a hydrogenated polyalphaolefin oil.

5. The fluid of claim 1 wherein said fluid contains from about 65 to 95 volume % base oil.

6. The fluid of claim 1 wherein said base oil has a kinematic viscosity at 100° C. of from about 0.4 to 6.0 cSt at 100° C.

7. The fluid of claim 1 wherein said fluid contains from about 1 to 8 kilograms per cubic meter of fluid of an emulsifier.

8. A method of lubricating a drill pipe when drilling a well, which method comprises circulating an invert drilling fluid throughout a borehole while simultaneously rotating a string of drill pipe having a drill bit on its lower end in contact with the bottom of the base hole so as to reduce the friction between the pipe and the sides of the borehole and to remove cuttings from the borehole, wherein said invert drilling fluid comprises a water-in-oil emulsion which includes:
(a) at least 50 volume percent of a low toxicity base oil having an $LC_{50}$ greater than 30,000 ppm (SPP, mysid shrimp, 96-hour acute toxicity), and
(b) at least one additive selected from the group consisting of emulsifiers, viscosifiers, weighting agents, oil wetting agents and fluid loss preventing agents, at least about 25 volume percent of the base oil content of the drilling fluid being one or more linear alpha-olefins which have from about 14 to 30 carbon atoms.

9. The method of claim 8 wherein said linear alpha-olefins have from about 16 to 20 carbon atoms.

10. The method of claim 8 wherein at least about 75 volume percent of the base oil content is one or more linear alpha-olefins.

TABLE III

Testing of simple Invert Muds Formulated with Linear Alpha-Olefin (LAO) Oils

| FLUID | $C_{14}LAO$[1] | | 75% $PAO$[3] 25% $C_{16-18}$ $LAO$[2] | | 50% $PAO$[3] 50% $C_{16-18}$ $LAO$[2] | | 25% $PAO$[3] 75% $C_{16-18}$ $LAO$[2] | |
| --- | --- | --- | --- | --- | --- | --- | --- | --- |
| Hot Rolled? | I[4] | HR[5] | I | HR[5] | I | HR[5] | I | HR[5] |
| 600 rpm Dial Reading[6] | 10 | 11 | 20 | 25 | 21 | 22 | 19 | 20 |
| 300 rpm Dial Reading | 6 | 6 | 11 | 13 | 11 | 11.5 | 10 | 10.5 |
| 200 rpm Dial Reading | 4 | 4 | 5.25 | 8.5 | 8 | 8 | 7.5 | 7.5 |
| 100 rpm Dial Reading | 2.25 | 2.25 | 3.75 | 4.75 | 4 | 4 | 3.5 | 3.75 |
| 6 rpm Dial Reading | 0.75 | 0.75 | 0.5 | 1 | 0.5 | 0.75 | 0.75 | 0.75 |
| 3 rpm Dial Reading | 0.75 | 0.75 | 0.5 | 0.75 | 0.5 | 0.75 | 0.75 | 0.75 |
| Plastic Viscosity, cp | 4 | 5 | 9 | 12 | 10 | 10.5 | 9 | 9.5 |
| Yield Point, lb/100 ft$^2$ | 2 | 1 | 2 | 1 | 1 | 1 | 1 | 1 |
| Gel Strength, lb/100 ft$^2$ | 1/1 | 1/1 | 1/1 | 1/1 | 1/1 | 0/1 | 1/1 | 1/1 |
| Electrical Stability, V | 173 | 275 | 281 | 272 | 244 | 230 | 228 | 291 |

[1]Typically about 95% wt $C_{14}$ with 80 mol % minimum linear alpha-olefin
[2]Typically about 55/35/10% by wt $C_{16}/C_{18}/C_{20}$ with 60 mol % minimum linear alpha-olefin
[3]ETHYLFLO ® 162 polyalphaolefin from 1-decene
[4]Initial value before hot rolling
[5]Hot rolled at 225° F. (107.2° C. for 16 hours)
[6]Fann Viscometer dial reading

What is claimed is:

1. An invert drilling fluid which comprises a water-in-oil emulsion which includes (a) at least 50 volume percent of a low toxicity base oil having an $LC_{50}$ greater linear alpha-olefins.

11. The method of claim 8 in which the base oil comprises one or more linear alpha-olefins and a hydrogenated polyalphaolefin oil.

12. The method of claim 8 wherein said fluid contains from about 65 to 95 volume % base oil.

13. The method of claim 8 wherein said base oil has a kinematic viscosity at 100° C. of from about 0.4 to 6.0 cSt at 100° C.

14. The method of claim 8 wherein said fluid contains from about 1 to 8 kilograms per cubic meter of fluid of an emulsifier.

15. The fluid of claim 1 wherein said fluid contains at least one additive selected from viscosifiers, weighting agents, oil wetting agents and fluid loss preventing agents.

* * * * *